United States Patent
Soo et al.

(10) Patent No.: US 8,548,146 B2
(45) Date of Patent: Oct. 1, 2013

(54) METHOD AND SYSTEM TO MANAGE CONNECTIONS ON A CONFERENCE BRIDGE

(75) Inventors: Armstrong Soo, San Ramon, CA (US); Bernard Ku, Austin, TX (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 575 days.

(21) Appl. No.: 12/779,625

(22) Filed: May 13, 2010

(65) Prior Publication Data

US 2011/0280387 A1   Nov. 17, 2011

(51) Int. Cl.
 *H04M 3/56* (2006.01)
 *H04L 12/18* (2006.01)

(52) U.S. Cl.
 USPC .................. 379/202.01; 370/260; 455/416

(58) Field of Classification Search
 USPC ............ 370/260, 263, 265–270; 379/201.01, 379/202.01–206.01; 455/416
 See application file for complete search history.

(56) References Cited

U.S. PATENT DOCUMENTS

| | | | |
|---|---|---|---|
| 5,995,827 A * | 11/1999 | Gitlin et al. | 455/416 |
| 6,721,411 B2 | 4/2004 | O'Malley et al. | |
| 6,839,416 B1 * | 1/2005 | Shaffer | 379/202.01 |
| 7,016,315 B2 | 3/2006 | Armbruster et al. | |
| 7,515,703 B1 * | 4/2009 | Grigsby et al. | 379/392.01 |
| 7,519,347 B2 | 4/2009 | Winsvold | |
| 7,545,923 B1 | 6/2009 | Campion | |
| 7,567,270 B2 * | 7/2009 | Chapweske et al. | 348/14.08 |
| 8,184,791 B2 * | 5/2012 | Valdez | 379/202.01 |
| 8,218,751 B2 * | 7/2012 | Hepworth et al. | 379/204.01 |
| 2004/0266488 A1 * | 12/2004 | Ghomeshi et al. | 455/567 |
| 2006/0126538 A1 * | 6/2006 | Krstulich | 370/260 |
| 2009/0097677 A1 | 4/2009 | Shaffer et al. | |
| 2009/0316870 A1 * | 12/2009 | Wise et al. | 379/202.01 |
| 2011/0135078 A1 * | 6/2011 | Soo et al. | 379/202.01 |

* cited by examiner

*Primary Examiner* — Harry Hong
(74) *Attorney, Agent, or Firm* — Hoffmann & Baron, LLP

(57) ABSTRACT

A method is for managing connections on a conference bridge. The method includes determining a first noise level associated with a connection between a conference port and a conference server while there is no substantial contribution to the first noise level by a participant's device, determining a second noise level associated with a connection between the participant's device and the conference port while there is no substantial contribution to the second noise level by the participant's device, and determining whether the participant's device should be allowed to be connected to the conference bridge or whether at least one corrective action should be performed based on at least one of the first and second noise levels. Corresponding computer-readable mediums and systems are disclosed.

20 Claims, 6 Drawing Sheets

(STEP 1)

(STEP 2)

(STEP 2 continued)

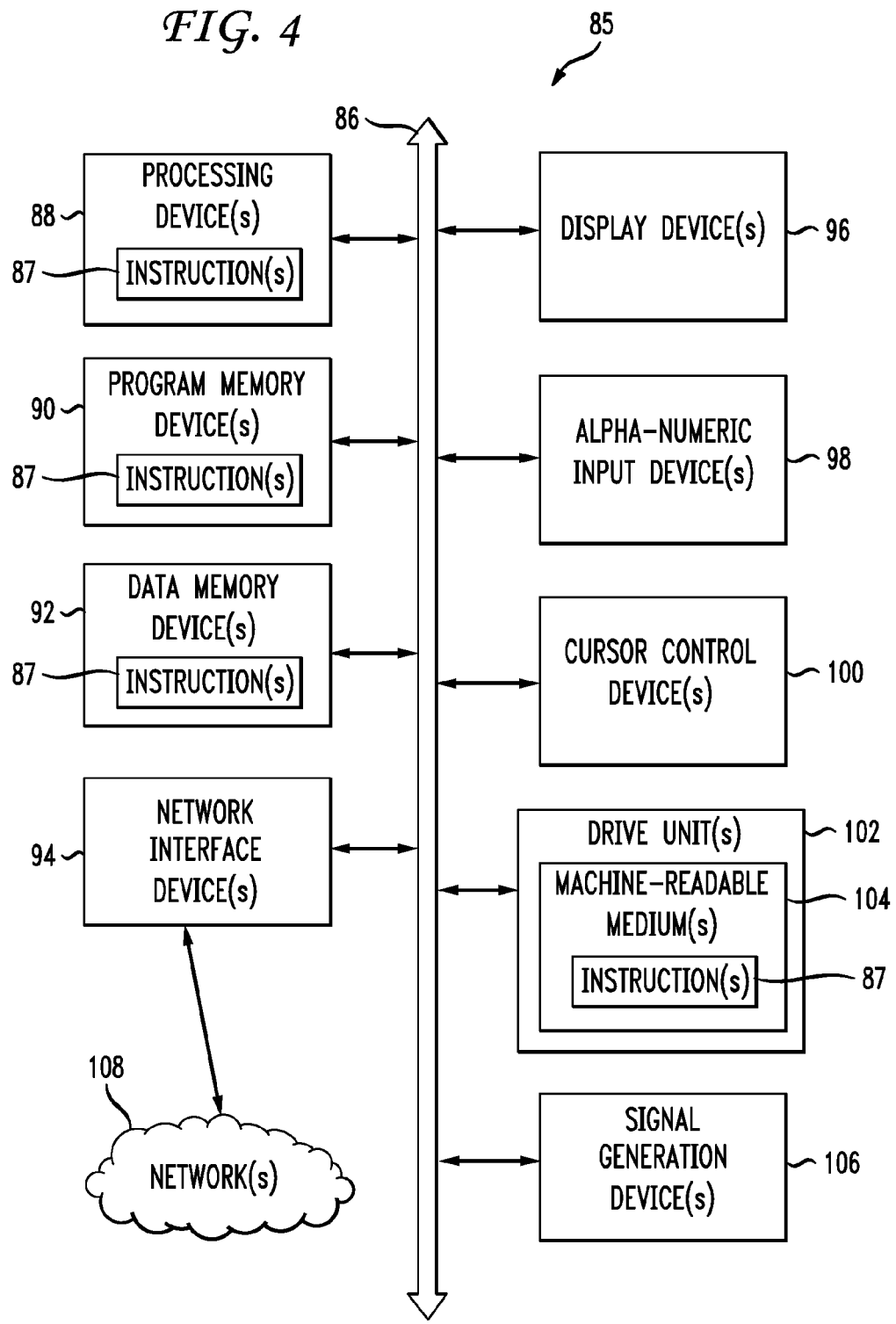

METHOD AND SYSTEM TO MANAGE CONNECTIONS ON A CONFERENCE BRIDGE

BACKGROUND

1. Field

The present disclosure relates to the management of connections on a conference bridge, such as an audio and/or video conference bridge, and more specifically relates to the detection and correction or self-repair of noisy connections on a conference bridge.

2. Brief Description of the Related Art

Audio conferencing has become a major business productivity tool. Many companies prefer audio conferencing over traveling due to the associated savings in travel, manpower, and scheduling costs.

Conferencing participants are often frustrated when there is noise on the line. This becomes a major inconvenience and obstacle to productivity when all participants are told to disconnect and re-join the conference, just to find out that the noise remains. The frustration level increases in proportion to the number of participants and, in some instances, the distance between the participants. Asking participants to mute their phones often does not solve the problem because the culprit may not be the devices but the internal conferencing system. Hanging up and re-connecting may result in an offending participant being connected to the same bad port again.

Hosts can selectively mute participants, but this will substantially impede the group discussion, which is the primary purpose of conducting conference calls. In addition, participants may not know that they are the offending parties.

SUMMARY

The disclosure is directed to a method of managing connections on a conference bridge. The method includes determining, using a noise detection device, a first noise level associated with a connection between a conference port and a conference server. The first noise level is determined while there is no substantial contribution to the first noise level by a participant's device. The method also includes determining, using the noise detection device, a second noise level associated with a connection between the participant's device and the conference port. The second noise level is determined while there is no substantial contribution to the second noise level by the participant's device. The method further includes determining, using a processing device, whether the participant's device should be allowed to be connected to the conference bridge or whether at least one corrective action should be performed based on at least one of the first and second noise levels.

The method may also include muting the participant's device, during which the first noise level is determined, and unmuting the participant's device after the first noise level has been determined. The second noise level may be determined while a participant using the participant's device is silent. The first noise level may be determined at the conference server, and the second noise level may be determined at the conference port. The corrective action may include at least one of redirecting the participant's call to a different conference port, defining the conference port as out-of-operation (OOO), issuing an audio alert indicating that the conference port is inoperable, issuing an audio alert indicating that the conference port is noisy, issuing an audio alert indicating that the conference port is muted, and muting at least one of the connection between the participant's device and the conference port and the connection between the conference port and the conference server.

The method may also include determining whether a conference host is an offending party based on at least one of the first and second noise levels, and performing, in response to determining that the conference host is an offending party, at least one of allowing the conference host to delegate a new host, disconnecting the conference host, and issuing an audio alert indicating status of the new host to the new host. The method may also include performing, in response to an offending party refusing to be disconnected, at least one of force muting the offending party, force disconnecting the offending party, and issuing an audio alert to the offending party until the offending party is disconnected.

The disclosure is further directed to a computer-readable medium including instructions that, when executed by a processing device, cause the processing device to manage connections on a conference bridge by determining a first noise level associated with a connection between a conference port and a conference server, the first noise level being determined while there is no substantial contribution to the first noise level by a participant's device; determining a second noise level associated with a connection between the participant's device and the conference port, the second noise level being determined while there is no substantial contribution to the second noise level by the participant's device; and determining whether the participant's device should be allowed to be connected to the conference bridge or whether at least one corrective action should be performed based on at least one of the first and second noise levels.

The first noise level may be determined while the participant's device is muted, and the participant's device may be unmuted after the first noise level has been determined. The second noise level may be determined while a participant using the participant's device is silent. The first noise level may be determined at the conference server, and the second noise level maybe determined at the conference port. The corrective action may include at least one of redirecting the participant's call to a different conference port, defining the conference port as out-of-operation (OOO), issuing an audio alert indicating that the conference port is inoperable, issuing an audio alert indicating that the conference port is noisy, issuing an audio alert indicating that the conference port is muted, and muting at least one of the connection between the participant's device and the conference port and the connection between the conference port and the conference server.

The instructions that, when executed by a processing device, may also cause the processing device to manage connections on an audio conference bridge by determining whether a conference host is an offending party based on at least one of the first and second noise levels, and performing, in response to determining that the conference host is an offending party, at least one of allowing the conference host to delegate a new host, disconnecting the conference host, and issuing an audio alert indicating status of the new host to the new host. The instructions may also cause the processing device to manage connections on an audio conference bridge by performing, in response to an offending party refusing to be disconnected, at least one of force muting the offending party, force disconnecting the offending party, and issuing an audio alert to the offending party until the offending party is disconnected.

The disclosure is further directed a system to manage connections on a conference bridge, the system, which includes a noise detection device and a processing device. The noise detection device determines a first noise level associated with a connection between a conference port and a conference server. The first noise level is determined while there is no substantial contribution to the first noise level by a participant's device. The noise detection device determines a second noise level associated with a connection between the participant's device and the conference port. The second noise level is determined while there is no substantial contribution to the second noise level by the participant's device. The processing device is operatively coupled to the noise detection device, and determines whether the participant's device should be allowed to be connected to the conference bridge or whether at least one corrective action should be performed based on at least one of the first and second noise levels. The first noise level may be determined at the conference server and the second noise level may be determined at the conference port.

Objects and features of these embodiments will become apparent from the following detailed description considered in conjunction with the accompanying drawings. It is to be understood, however, that the drawings are designed as an illustration only and not as a definition of the limits of these embodiments.

BRIEF DESCRIPTION OF THE DRAWINGS

The drawings constitute a part of this specification and include exemplary embodiments to the invention, which may be implemented in various forms. It is to be understood that in some instances various aspects of the invention may be shown exaggerated or enlarged to facilitate an understanding of the invention.

FIG. 4 is a block diagram of a system to detect and correct noisy connections on a conference bridge in accordance with the disclosure herein.

DETAILED DESCRIPTION

This disclosure describes methods and systems to detect and correct or self-repair noisy connections on a conference bridge. These methods and systems are designed as a transparent system function, and thus do not require a user's intervention.

Figure 1:
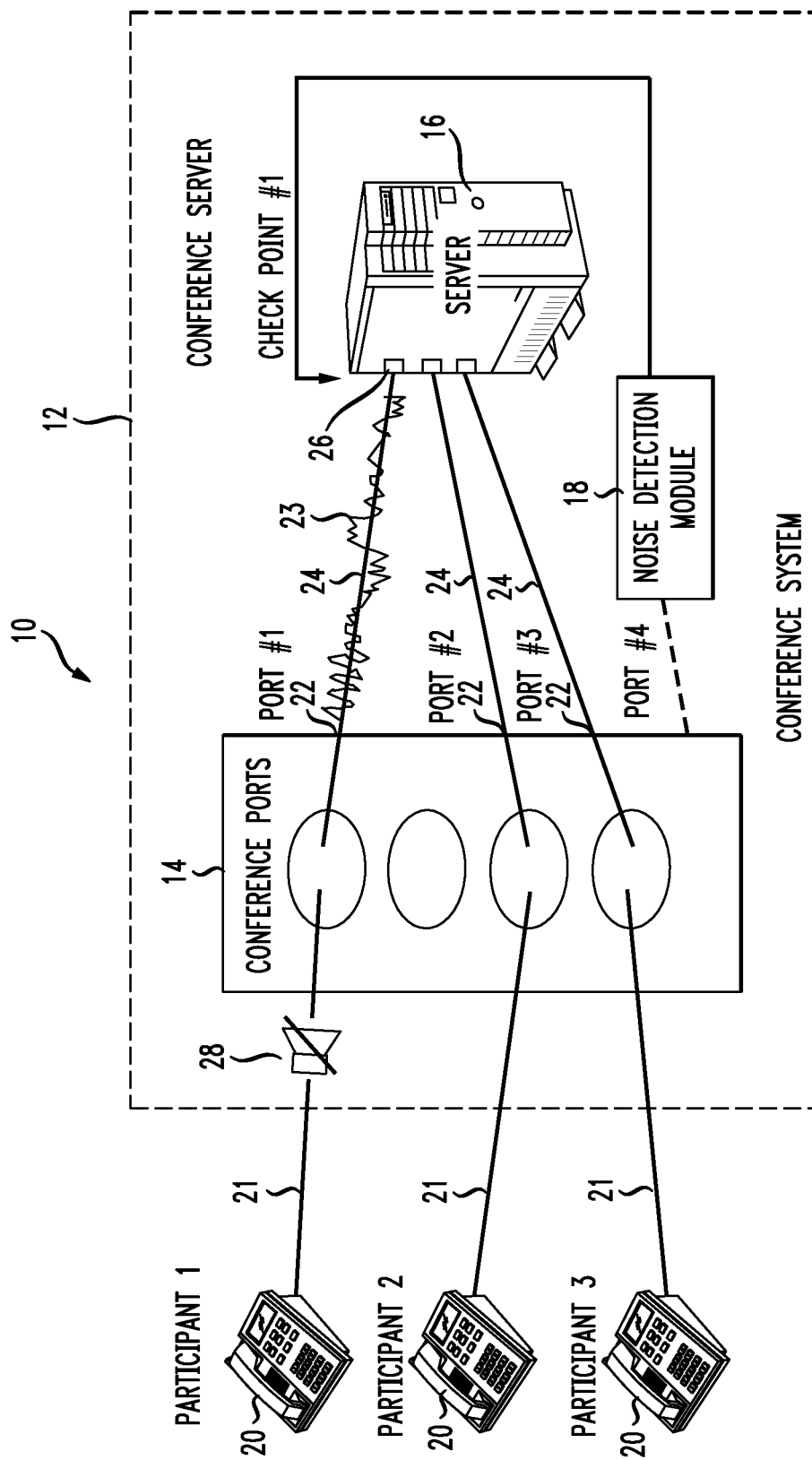
FIG. 1 is a block diagram of a first portion of a method and system to detect and correct connections on a conference bridge in accordance with the disclosure herein.

FIG. 1 shows a block diagram of an illustrative embodiment 10, which demonstrates a first portion of a method to detect and self-repair noisy connections on a conference bridge in accordance with the disclosure herein. A conference bridge is intended to refer to a facility within a service provider or carrier that connects multiple callers together and monitors the conference call session. The conference bridge is used to electronically balance the lines so that each caller can hear and speak to all the others no matter how many people hop on or off the conference call. The embodiment 10 includes a plurality of participant devices 20 and a conference system 12, which includes conference ports 14, a conference server 16, and a noise detection device 18. This portion of the method attempts to detect and repair faulty internal components associated with the conference system 12, such as server-side conference ports 22 or the lines 24 connecting the conference ports 14 to the conference server 16.

Each conference port 14, conference server 16, and participant device 20 may include a processing device and memory for program and data storage, such as on a computer-readable medium. A plurality of server lines 24 are provided, each of the server lines 24 connects the conference server 16 to one of a plurality of conference ports 22. A plurality of participant lines 21 is also provided. Each of the plurality of participant lines 21 connects one of a plurality of participant devices 20 to one of the conference ports 14. A conference participant listens and communicates with other conference participants using the participant devices 20 during a conference call. The participant devices 20 can include a telephone, cell phone, or an alternative device capable of participating on a conference call. The noise detection device 18 measures noise at a selected checkpoint or source of the noise. As shown in FIG. 1, noise 23 exists on the server line 24 connecting the conference port 22 to the conference server 16.

When a participant's 20 call is answered, the conference port 14 mutes 28 the participant's call for a short period of time (e.g., 0.5 sec). Alternatively, the same function may be performed when there is, for any reason, no substantial contribution by the participant's device to the noise level on the connection between the conference port and the conference server. The noise detection device 18 then obtains a noise or noise level reading at checkpoint 1, which may be at a port 26 of the conference server 16. The noise level is intended to refer to a quantitative value of the amount of noise on any particular connection. A positive noise reading greater than a benchmark or threshold suggests a faulty internal component that prompts the noise detection device 18 to take action, such as (1) re-directing the participant's call to a different conference port 14, (2) defining the conference port 14 as being out-of-service (OOO), and/or (3) disconnecting the participant's call. Checkpoint 1 is preferably located as close to the conference server 16 as possible after processing, such as at port 26 of the conference server 16.

Figure 2:
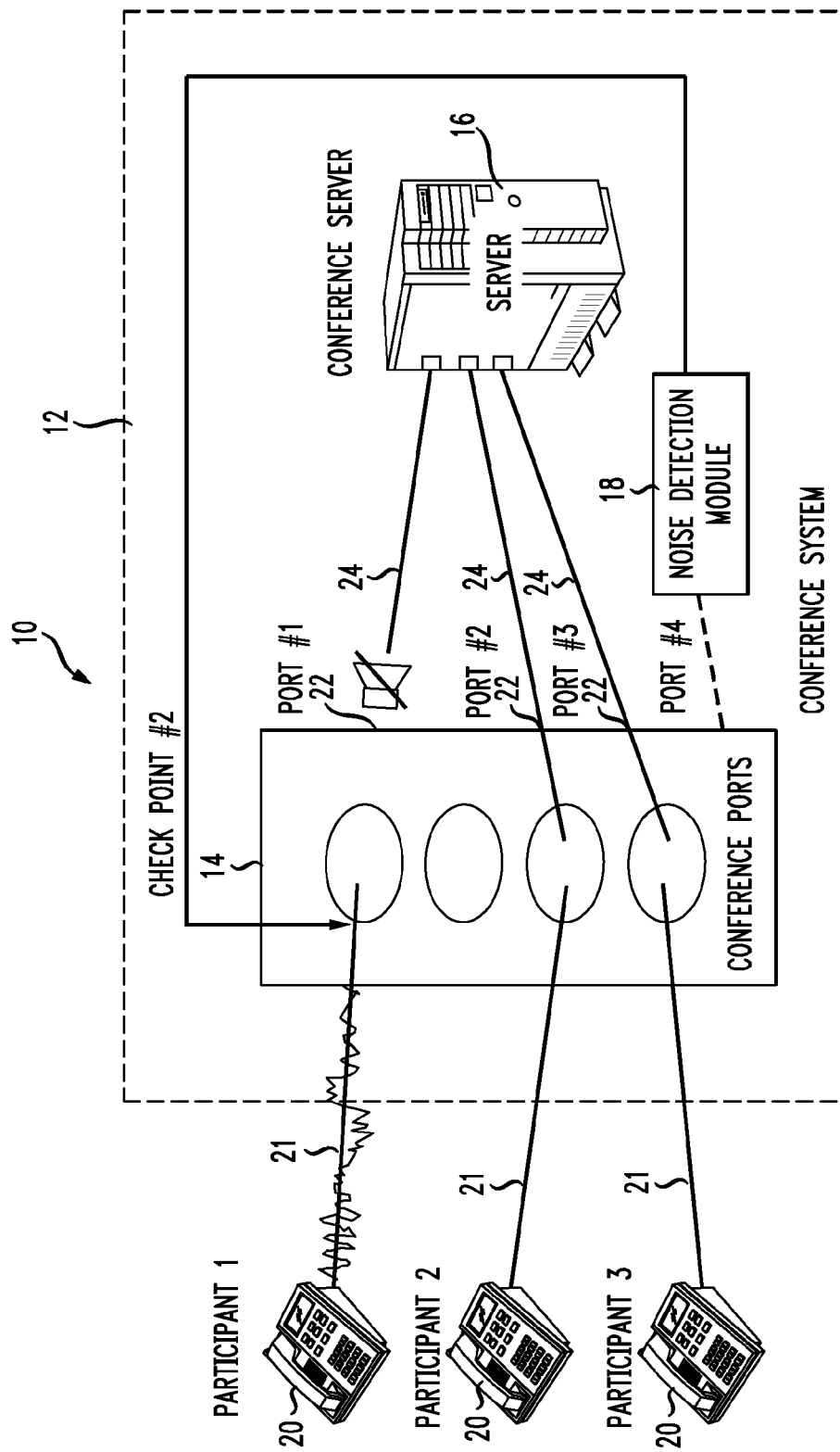
FIG. 2 is a block diagram of a second portion of the method and system to detect and correct noisy connections on a conference bridge in accordance with the disclosure herein.

FIG. 2 shows a block diagram of a second portion of the method and system 10 to detect and correct noisy connections on an audio conference bridge in accordance with the disclosure herein. The second portion attempts to detect and self-repair faulty customer premise equipment (CPE) and connections between the participants device 20 and conference ports 14. The second portion measures baseline noise levels at checkpoint 2 when the participant 10 is not talking. Alternatively, the same function may be performed when there is, for any reason, no substantial contribution by the participant's device 20 to the noise level on the connection between the participant's device 20 and the conference port 24. However, rather than telling the participant not to talk, this portion provides a more natural method to achieve the same result by performing the noise sampling when the participant 20 is less likely to be talking Examples include (1) after entering a personal identification number (PIN) code or after the system announces "please wait while you are being connected". The silent period is configurable based on the call flow. Once the silent period is determined, the noise detection device 18 obtains a noise reading at checkpoint 2.

Based on this noise reading, configurable or programmable actions may be taken. For example, if the reading is below a predetermined threshold (TH2A), then the participant's call may be allowed to proceed.

If the noise level is within a predetermined threshold range, such as between TH2A and TH2B, then the system may provide a one-way audio message alerting the participant's device 20 that the participant may have a noisy line. Audio alerting is intended to refer to providing an audio message to a participant's device 20. The system can further suggest muting the line automatically, such as by stating, "You may have a noisy line. You may want to disconnect and try dialing in again from a different place or using a different handset. If you choose to continue, your line will be muted. To un-mute, press *88. To re-mute, press *88. The system will also automatically re-mute your line if no speech is detected for 5 seconds".

If the noise level is above a predetermined threshold, the system may mute the line permanently or drop the call.

If the host of the audio conference is the offending party, the system can allow the host to delegate another participant device 20 as the new host via a web-based control panel (e.g., WebEx, which is an application sharing and conferencing service used for presentations, demonstrations, training, and support that was developed by WebEx Communications, Inc., Santa Clara, Calif. (www.webex.com)) which would allow the original host to disconnect without closing the conference bridge. The offending party is intended to refer to any participant's device that is associated with a connection for which the noise level has met or exceeded either threshold TH2A or threshold TH2B. As a non-limiting example of possible values of the thresholds, TH1=25 dBA, TH2A=30 dBA, and TH2B=35 dBA. The system would then provide a one-way audio message alerting the new host of its status. If the offending participant will not disconnect, the conference host may force-mute and/or force-disconnect the offending participant via a web-based control panel. Force-muting or force-disconnecting is intended to refer to muting or disconnecting a participant's device without the permission or intervention of the participant associated with the device being muted or disconnected. The conference host is intended to refer to the participant's device associated with a caller that has initiated the conference call. In this case, the system provides a one-way audio message alerting the offending participant of the impending mute and/or disconnect until the line is muted and/or disconnected.

It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform anyone or more of the methodologies discussed herein.

Figure 3A:
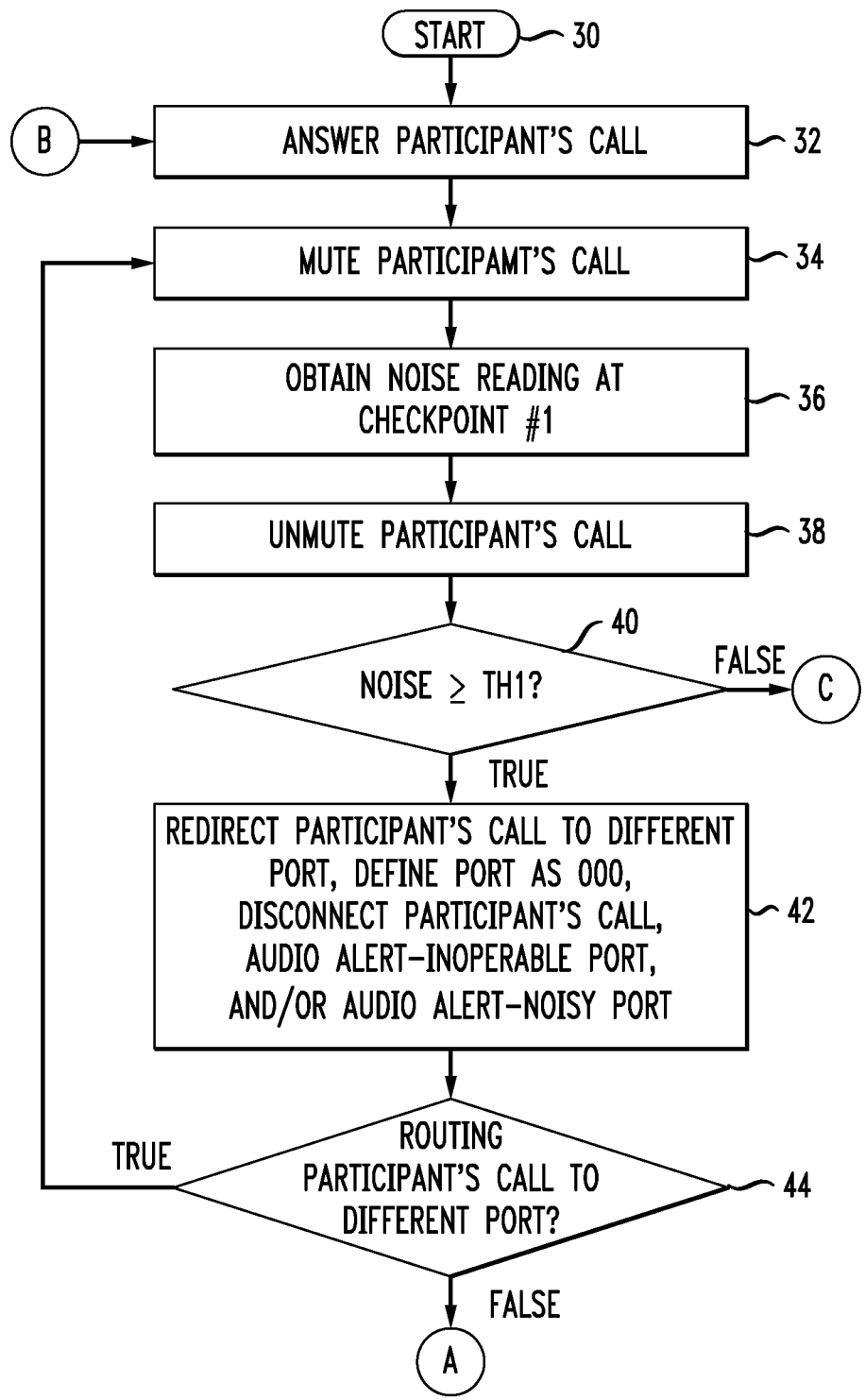
FIGS. 3A-C show a flowchart of the method to detect and correct noisy connections on a conference bridge in accordance with the disclosure herein.
Figure 3B:
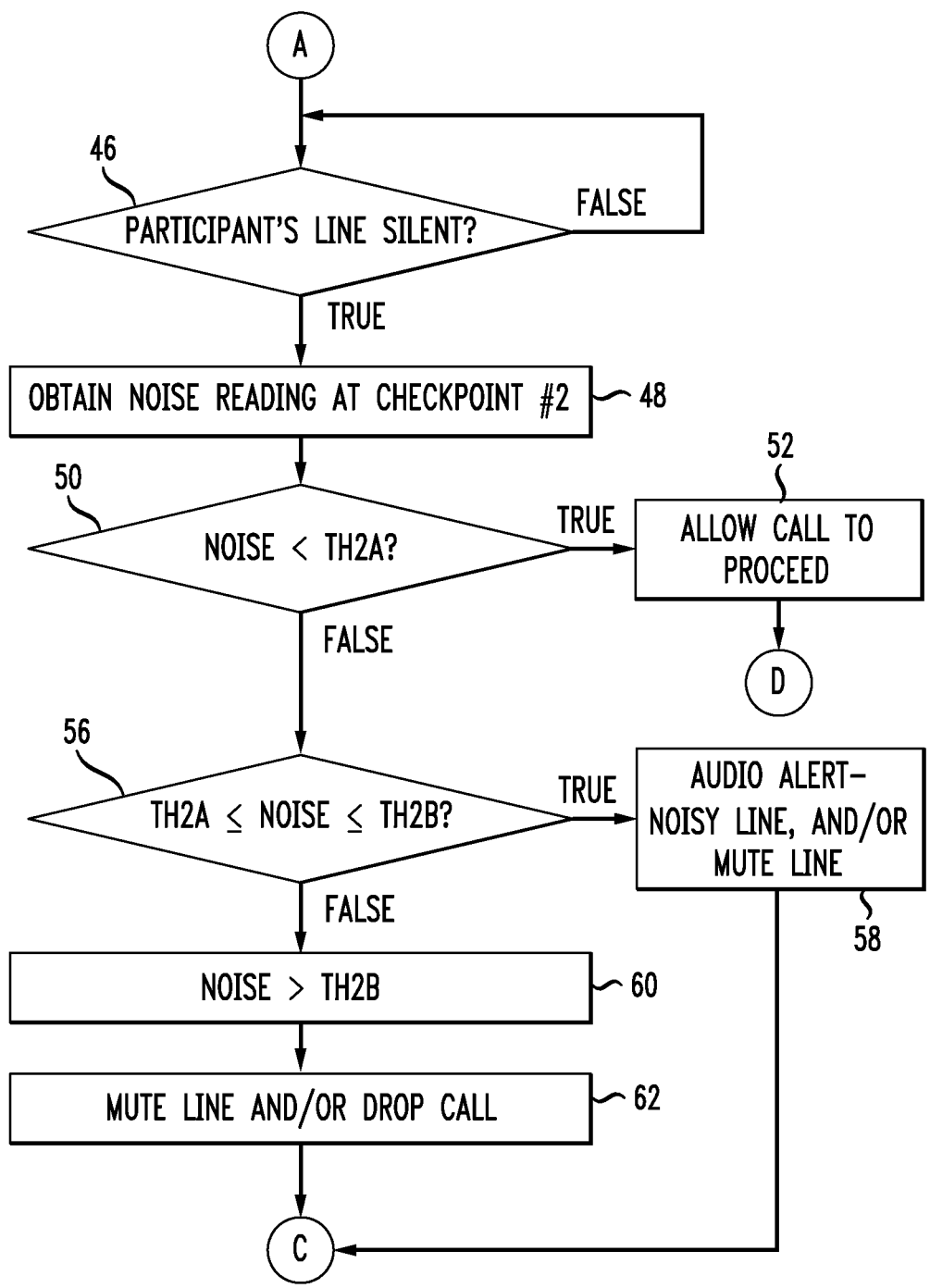
Figure 3C:
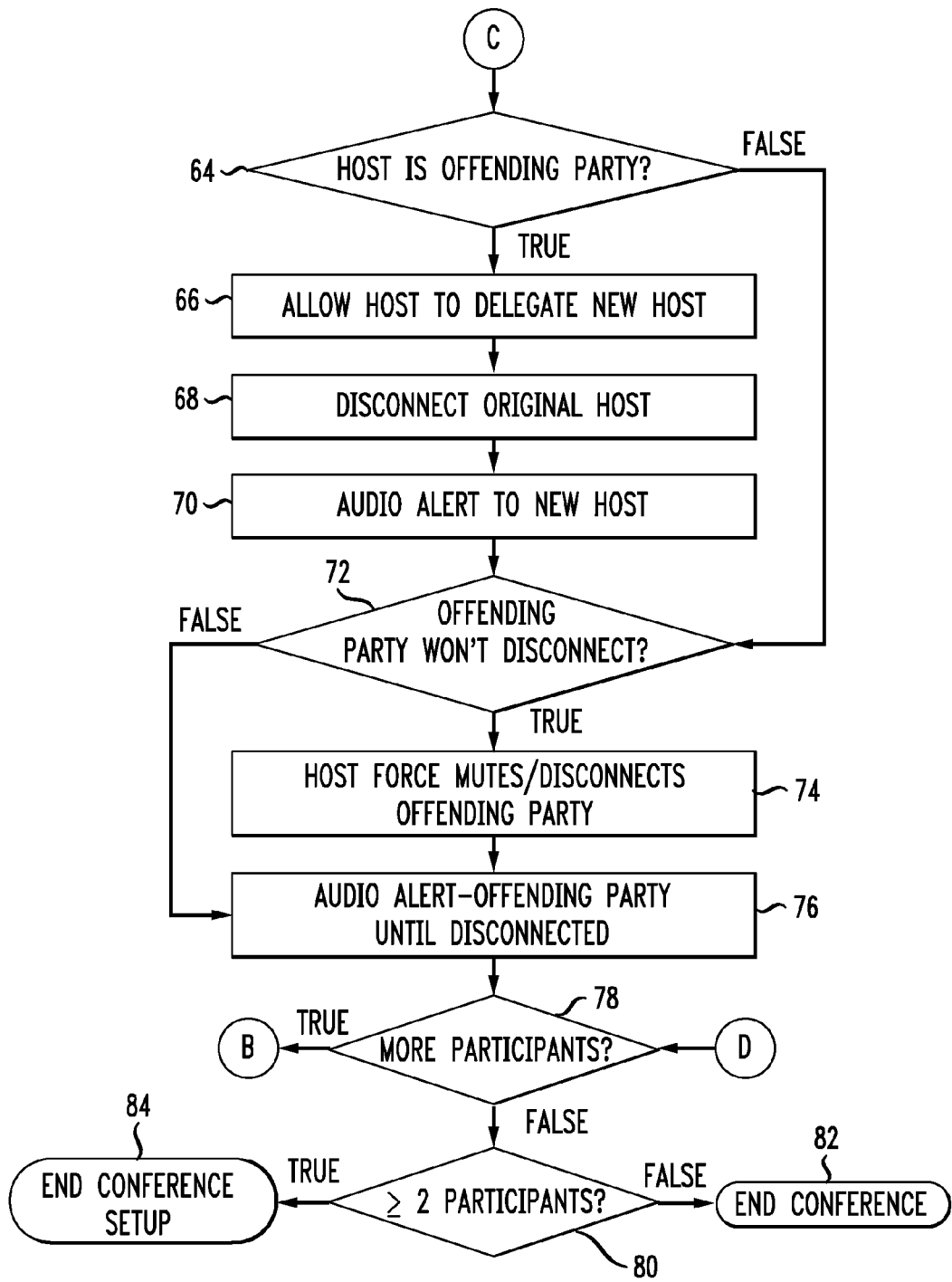

FIGS. 3A-C show a flowchart of one embodiment of the method in accordance with the disclosure herein. It is to be noted that the embodiment shown in FIGS. 3A-C is only one example of the disclosed method and is not intended to limit the scope of the disclosure in any way. The method begins at operation 30 and proceeds to answer a participant's call in operation 32. The participant's call is muted in operation 34 and a noise reading is obtained by the noise detection device at checkpoint 1 in operation 36. The participant's call is unmuted in operation 38 and, if the noise level is greater than or equal to a first threshold TH1 determined at operation 40, the participant's call is (1) redirected to a different port, (2) the port is defined as out-of-operation (OOO), (3) disconnected, and/or (4) an audio alert is issued indicating the port is inoperable and/or noisy at operation 42. If the participant's call is being routed to a different port at operation 44, the method proceeds to operation 34, in which the participant's call is again muted. If the participant's call is not being routed to a different port in operation 44, the method proceeds to operation 46 shown in FIG. 3B, during which the method waits for the participant's line to become silent. Likewise, if the noise level is less than the first threshold TH1 at operation 40, the method proceeds to operation 64 shown in FIG. 3c to determine whether the host is the offending party.

A noise reading is obtained by the noise detection device at checkpoint 2 in operation 48, and if the noise level is less than a second minimum threshold TH2A at operation 50, the call is allowed to proceed at operation 52 and the method proceeds to operation 78 to determine whether there are additional participant's. However, if the noise level determined at operation 50 is not less than the second minimum threshold TH2A, operation 56 determines whether the noise level is between the second minimum threshold TH2A and a second maximum threshold TH2B. If the noise level is between or equal to thresholds TH2A and TH2B, an audio alert is issued at operation 58 indicating that the line is noisy and/or will be muted. The method then continues to operation 64 shown in FIG. 3C, which determines whether the host is the offending party. If the noise level is determined not to be between or equal to thresholds TH2A and TH2B at operation 56, then the noise must be greater than threshold TH2B at operation 60 and the call is either muted and/or dropped at operation 62. The method then proceeds to operation 64 shown in FIG. 3C, which determines whether the host is the offending party.

If it is determined that the host is the offending party at operation 64, then the host is allowed to delegate a new host at operation 66, and the original host is disconnected at operation 68. An audio alert is provided to the new host at operation 70. If the offending party will not disconnect at operation 72, the host may force mute and/or force disconnect the offending party at operation 74, and an audio alert indicating this action is provided to the offending party until the offending party is muted and/or disconnected at operation 76. If there are additional participants, the method proceeds to determine whether there are two or more participants in step 80. If there are fewer than two participants in step 80, the conference is ended in step 82 as having too few participants to hold a conference. If there are two or more participants as determined at operation 80, the conference setup is terminated in operation 84. If it is determined that there are additional participants at operation 78, the method returns to step 32 shown in FIG. 3A to answer the additional participant's call. If the offending party will not disconnect at operation 72, the method proceeds to providing an audio alert to the offending party until muted and/or disconnected at operation 76. If the host is not the offending party at operation 64, the method proceeds to operation 72 to determine whether the offending party will disconnect.

FIG. 4 is a block diagram of an embodiment of a machine in the form of a computing system 85, within which a set of instructions 87, that when executed, may cause the machine to perform any one or more of the methodologies disclosed herein. In some embodiments, the machine operates as a standalone device. In some embodiments, the machine may be connected (e.g., using a network) to other machines. In a networked implementation, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communication device, a wireless telephone, a land-line telephone, a control system, a camera, a scanner, a facsimile machine, a printer, a pager, a personal trusted device, a web appliance, a network router, a switch or bridge, or any machine capable of executing a set of instructions (sequential or otherwise) that specify actions to be taken by that machine.

The computing system 85 may include a processing device(s) 88 (e.g., a central processing unit (CPU), a graphics processing unit (GPU), or both), program memory device(s) 90, and data memory device(s) 92, which communicate with each other via a bus 86. The computing system 85 may further include display device(s) 96 (e.g., liquid crystals display (LCD), a flat panel, a solid state display, or a cathode ray tube (CRT)). The computing system 85 may include input device(s) 98 (e.g., a keyboard), cursor control device(s) 100 (e.g., a mouse), disk drive unit(s) 102, signal generation device(s) 106 (e.g., a speaker or remote control), and network interface device(s) 94.

The disk drive unit(s) 102 may include machine-readable medium(s) 104, on which is stored one or more sets of instructions 87 (e.g., software) embodying any one or more of the methodologies or functions disclosed herein, including those methods illustrated herein. The instructions 87 may also reside, completely or at least partially, within the program memory device(s) 90, the data memory device(s) 92, and/or within the processing device(s) 88 during execution thereof by the computing system 85. The program memory device(s) 90 and the processing device(s) 88 may also constitute machine-readable media. Dedicated hardware implementations including, but not limited to, application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 87, or that which receives and executes instructions 87 from a propagated signal so that a device connected to a network environment 108 can send or receive voice, video or data, and to communicate over the network 108 using the instructions 87. The instructions 87 may further be transmitted or received over a network 108 via the network interface device(s) 94. The machine readable medium may also contain a data structure for storing data useful in providing a functional relationship between the data and a machine or computer in an illustrative embodiment of the disclosed systems and methods.

While the machine-readable medium 104 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include anyone or more of a tangible machine-readable medium or a tangible distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

In a particular non-limiting, example embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods, functions or logic described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods, functions or logic described herein.

It should also be noted that software which implements the disclosed methods, functions or logic may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although specific example embodiments have been described, it will be evident that various modifications and changes may be made to these embodiments without departing from the broader scope of the inventive subject matter described (invention) herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

The disclosed methods and systems enable an increase in productivity since substantial business is conducted over conference bridges. Revenue may be derived by licensing this patent to device manufacturers or network-based conferencing infrastructure developers.

The disclosed embodiments advantageously do not require utilization of complex algorithm that require payment of licensing fees, and there is no need to ask participants to all hang-up and call back again, which results in substantial savings in time and cost. Further, the disclosed embodiments advantageously are not dependent upon codec or transport (wireless, wireline, TDM, VoIP) protocols, and enable flexible disposition of offending participants upon identifying the associated noisy connection.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method of managing connections on a conference bridge, the method comprising:
    determining, using a noise detection device, a first noise level associated with a connection between a conference port and a conference server, the first noise level being obtained while a participant's device is muted;
    determining, using the noise detection device, a second noise level associated with a connection between the participant's device and the conference port, the second noise level being obtained while the participant's device is silent; and
    determining, using a processing device, whether the participant's device should be allowed to be connected to the conference bridge and whether a corrective action should be performed based on the first and second noise levels.

2. The method of managing connections on a conference bridge, as defined by claim 1, further comprising muting the participant's device, the first noise level being determined while the participant's device is muted.

3. The method of managing connections on a conference bridge, as defined by claim 1, further comprising unmuting the participant's device after the first noise level has been determined.

4. The method of managing connections on a conference bridge, as defined by claim 1, wherein the second noise level is determined while a participant using the participant's device is silent.

5. The method of managing connections on a conference bridge, as defined by claim 1, wherein the first noise level is determined at the conference server.

6. The method of managing connections on a conference bridge, as defined by claim 1, wherein the second noise level is determined at the conference port.

7. The method of managing connections on a conference bridge, as defined by claim 1, wherein the corrective action comprises redirecting the participant's call to a different conference port, defining the conference port as out-of-operation (OOO), issuing an audio alert indicating that the conference port is inoperable, issuing an audio alert indicating that the conference port is noisy, issuing an audio alert indicating that the conference port is muted, and muting the connection between the participant's device and the conference port and the connection between the conference port and the conference server.

8. The method of managing connections on a conference bridge, as defined by claim 1, further comprising:
   determining whether a conference host is an offending party based on the first and second noise levels; and
   performing, in response to determining that the conference host is an offending party, allowing the conference host to delegate a new host, disconnecting the conference host, and issuing an audio alert indicating status of the new host to the new host.

9. The method of managing connections on a conference bridge, as defined by claim 1, further comprising performing, in response to an offending party refusing to be disconnected, force muting the offending party, force disconnecting the offending party, and issuing an audio alert to the offending party until the offending party is disconnected.

10. A tangible computer-readable storage medium, comprising instructions that, when executed by a processing device, cause the processing device to manage connections on a conference bridge by performing operations comprising:
    determining a first noise level associated with a connection between a conference port and a conference server, the first noise level being determined while a participant's device is muted;
    determining a second noise level associated with a connection between the participant's device and the conference port, the second noise level being determined while the participant's device is silent; and
    determining whether the participant's device should be allowed to be connected to the conference bridge and whether a corrective action should be performed based on the first and second noise levels.

11. The tangible computer-readable storage medium, as defined by claim 10, wherein the operations further comprise muting the participant's device, the first noise level being determined while the participant's device is muted.

12. The tangible computer-readable storage medium, as defined by claim 10, wherein the operations further comprise unmuting the participant's device after the first noise level has been determined.

13. The tangible computer-readable storage medium, as defined by claim 10, wherein the operations further comprise determining the second noise level while a participant using the participant's device is silent.

14. The tangible computer-readable storage medium, as defined by claim 10, wherein the operations further comprise determining the first noise level at the conference server.

15. The tangible computer-readable storage medium, as defined by claim 10, wherein the operations further comprise determining the second noise level at the conference port.

16. The tangible computer-readable storage medium, as defined by claim 10, wherein the one corrective action comprises redirecting the participant's call to a different conference port, defining the conference port as out-of-operation (OOO), issuing an audio alert indicating that the conference port is inoperable, issuing an audio alert indicating that the conference port is noisy, issuing an audio alert indicating that the conference port is muted, and muting the connection between the participant's device and the conference port and the connection between the conference port and the conference server.

17. The tangible computer-readable storage medium, as defined by claim 10, wherein the operations further comprise:
    determining whether a conference host is an offending party based on the first and second noise levels; and
    performing, in response to determining that the conference host is an offending party, allowing the conference host to delegate a new host, disconnecting the conference host, and issuing an audio alert indicating status of the new host to the new host.

18. The tangible computer-readable storage medium, as defined by claim 10, wherein the operations further comprise performing, in response to an offending party refusing to be disconnected, force muting the offending party, force disconnecting the offending party, and issuing an audio alert to the offending party until the offending party is disconnected.

19. A system to manage connections on a conference bridge, the system comprising:
    a noise detection device, the noise detection device determining a first noise level associated with a connection between a conference port and a conference server, the first noise level being determined while a participant's device is muted, the noise detection device determining a second noise level associated with a connection between the participant's device and the conference port, the second noise level being determined while the participant's device is silent; and
    a processing device, the processing device operatively coupled to the noise detection device, the processing device determining whether the participant's device should be allowed to be connected to the conference bridge and whether a corrective action should be performed based on the first and second noise levels.

20. The system to manage connections on a conference bridge, as defined by claim 19, wherein the first noise level is determined at the conference server and the second noise level is determined at the conference port.

* * * * *